(12) United States Patent
Borgström et al.

(10) Patent No.: US 7,824,458 B2
(45) Date of Patent: Nov. 2, 2010

(54) CENTRIFUGAL SEPARATOR

(75) Inventors: Leonard Borgström, Tyresö (SE); Claes-Göran Carlsson, Tullinge (SE); Jan Skoog, Skogås (SE); Rolf Ridderstråle, Stockholm (SE)

(73) Assignee: Alfa Laval Corporate AB (SE)

( * ) Notice: Subject to any disclaimer, the term of this patent is extended or adjusted under 35 U.S.C. 154(b) by 255 days.

(21) Appl. No.: 12/279,185

(22) PCT Filed: Jan. 12, 2007

(86) PCT No.: PCT/SE2007/050010
§ 371 (c)(1), (2), (4) Date: Aug. 13, 2008

(87) PCT Pub. No.: WO2007/094724
PCT Pub. Date: Aug. 23, 2007

(65) Prior Publication Data
US 2009/0013658 A1 Jan. 15, 2009

(30) Foreign Application Priority Data
Feb. 13, 2006 (SE) .................................. 0600311

(51) Int. Cl.
*B01D 46/18* (2006.01)
(52) U.S. Cl. .............................. 55/400; 55/406; 55/407; 55/447; 55/467; 55/455; 55/385.3; 55/424; 55/428; 55/451; 55/423
(58) Field of Classification Search ........... 55/400–407, 55/447, 467, 455, 385.3, 424, 428, 451, 423
See application file for complete search history.

(56) References Cited

U.S. PATENT DOCUMENTS

| | | | | |
|---|---|---|---|---|
| 2,104,683 A | * | 1/1938 | Van Rosen et al. | 55/403 |
| 2,335,420 A | * | 11/1943 | Jones | 184/6.24 |
| 3,005,515 A | * | 10/1961 | Caddell | 96/282 |
| 3,234,716 A | * | 2/1966 | Sevin et al. | 210/360.1 |
| 3,447,290 A | * | 6/1969 | Flory | 55/322 |
| 4,198,218 A | * | 4/1980 | Erickson | 55/408 |
| 5,693,125 A | * | 12/1997 | Dean | 96/157 |
| 6,783,571 B2 | * | 8/2004 | Ekeroth | 95/8 |

(Continued)

FOREIGN PATENT DOCUMENTS

SE 454954 6/1988

(Continued)

*Primary Examiner*—Jason M Greene
*Assistant Examiner*—Dung Bui
(74) *Attorney, Agent, or Firm*—Michaud-Kinney Group LLP

(57) ABSTRACT

The invention refers to a centrifugal separator for cleaning of a gas containing liquid impurities. The centrifugal separator comprises a stationary casing, which encloses a separation space and has an inner wall surface. A rotating member is provided in the separation space and arranged to rotate in a direction of rotation around an axis (x) of rotation. The rotating member brings the gas to rotation for separation of the liquid impurities from the gas. A gas outlet is provided for discharge of the cleaned gas. A first liquid outlet is provided downstream the rotating member for discharge of separated liquid impurities. The separation space comprises an annular surface which extends between the rotating member and the inner wall surface. The annular surface is configured to transport liquid impurities radially outwardly to the first liquid outlet.

30 Claims, 5 Drawing Sheets

U.S. PATENT DOCUMENTS

| | | | |
|---|---|---|---|
| 6,821,319 B1* | 11/2004 | Moberg et al. | 95/270 |
| 7,022,150 B2* | 4/2006 | Borgstrom et al. | 55/338 |
| 7,077,881 B2* | 7/2006 | Franzen et al. | 55/401 |
| 7,235,177 B2* | 6/2007 | Herman et al. | 210/360.1 |
| 7,476,266 B2* | 1/2009 | Hallgren et al. | 55/406 |
| 2003/0000184 A1* | 1/2003 | Dean | 55/406 |
| 2003/0233939 A1* | 12/2003 | Szepessy et al. | 95/270 |
| 2004/0040442 A1 | 3/2004 | Franzen et al. | |

FOREIGN PATENT DOCUMENTS

| | | |
|---|---|---|
| SE | 505471 | 9/1997 |
| SE | 523690 | 5/2004 |

* cited by examiner

CENTRIFUGAL SEPARATOR

FIELD OF THE INVENTION

The present invention refers generally to a centrifugal separator for cleaning of gases from liquid impurities such as oil particles and oil mist.

BACKGROUND

SE-C-523690 discloses such a centrifugal separator, which is intended for cleaning of a gas containing liquid impurities in the form of oil particles and/or oil mist. The gas outlet for the cleaned gas extends in the known centrifugal separator from a lower part of the separation space. Immediately above the gas outlet, there is a shield element forming an annular surface extending into the separation space. Above the shield element at a distance therefrom, there is a number of outlet holes for discharge of the separated oil from the separation space. The separated oil is caught by the inner wall of the separation space and flows downwardly towards the outlet holes. Downstream the shield element, there is also an annular end surface in the proximity of the gas outlet.

The liquid impurities, for instance oil, which deposit on or are present in a layer close to such annular surfaces, will be conveyed radially inwardly towards the center of the separation space on the surface due to the fact that the rotation of the gas flow in this layer is decelerated by the friction against the non-rotating surface. It is therefore difficult to discharge the liquid impurities from the separation space.

SUMMARY

An object of the present invention is to provide a centrifugal separator, which in an efficient manner is capable of separating liquid impurities from a gas. Furthermore, it is aimed at a centrifugal separator, which has a simple construction and which ensures that separated liquid impurities located on the annular surface are transported out from the separation space.

This object is achieved by the centrifugal separator initially defined, which is characterized in that the annular surface is configured to transport liquid impurities radially outwardly to the first liquid outlet. By configuring the surface in such a way, the liquid impurities present on the surface may by means of the gas flow be brought to move outwardly towards the first liquid outlet.

According to one embodiment, the centrifugal separator comprises a number of guide elements provided on the annular surface and arranged to promote said transport. By means of the guide elements, the liquid impurities will, thanks to the influence from the gas flow in the separation space, be conveyed outwardly towards a larger diameter and thus to the inner wall surface and the second liquid outlet. Advantageously, said guide elements are, seen radially outwardly, directed forwardly in the direction of rotation. Thanks to such inclined, or in relation to a radial direction sloping elements, liquid impurities, both on the upstream side and the downstream side of the guide elements in relation to the direction of rotation and the gas flow, will be conveyed outwardly towards the first liquid outlet.

According to a further embodiment, said guide elements are substantially straight seen in the direction of the axis of rotation. The guide elements may advantageously also be curved seen in the direction of the axis of rotation.

According to a further embodiment, said guide elements are configured as ribs, which extend upwardly from the annular surface. Alternatively, said guide elements may be configured as grooves, which extend downwardly from the annular surface.

According to a further embodiment, each guide element has a first radially inner end and a second radially outer end, wherein the radially outer end is located in the proximity of but at a distance from the inner wall surface so that a radially outer passage is formed between the inner wall surface and the radially outer end. In such a way, the separated liquid impurities, which reach the inner wall, will flow on the annular surface along the inner wall surface until they reach an outlet of the first liquid outlet.

According to a further embodiment, the radially inner end is located in the proximity of but at a distance from an annular inner end of the annular surface so that a radially inner passage is formed between the annular inner end and the radially inner end. Advantageously, the annular inner end of the annular surface may be defined by an upwardly projecting surrounding surface, for instance a substantially cylindrical surface. Liquid impurities, which are transported inwardly by the gas flow on the annular surface, will then flow along this passage until they are caught by one of the guide elements and may be conveyed outwardly towards the first liquid outlet.

According to a further embodiment, the annular surface is conical and inclined outwardly and downwardly.

According to a further embodiment, the first liquid outlet comprises an annular collecting channel, which extends around the separation space radially outside the inner wall surface. Advantageously, the first liquid outlet may comprise at least one outlet hole, which extends between the separation space and the collecting channel and which adjoins the annular surface.

According to a further embodiment, the centrifugal separator is arranged to be provided in such a way that the axis of rotation extends substantially vertically, wherein the stationary casing has an upper end and a lower end and wherein the first liquid outlet is provided at the lower end. The annular surface may then form a lower end surface of the separation space.

According to a further embodiment, the gas outlet is provided in the proximity of the upper end.

According to a further embodiment, the rotating member comprises a number of separating discs.

According to a further embodiment, the centrifugal separator comprises also a second liquid outlet, which is provided upstream the gas outlet and downstream the first liquid outlet for discharge of separated liquid impurities and which comprises at least one outlet hole. By means of such a further liquid outlet, it is possible to collect the liquid impurities, which are transported on the inner wall surface towards the gas outlet. Advantageously, the first liquid outlet forms a main outlet and a second liquid outlet a residual outlet, wherein a main part of the liquid impurities will flow along the inner wall surface down to the second liquid outlet. A probably smaller part of the liquid impurities will due to the upwardly flowing gas flow be transported upwardly along the inner wall surface to the first liquid outlet. By such an arrangement, a proper separation of substantially all liquid impurities from the gas to be cleaned is ensured as well as a completely clean gas, which will leave the centrifugal separator via the gas outlet.

According to a further embodiment, the centrifugal separator comprises a surrounding ring groove, which extends outwardly from the inner wall surface in the stationary casing and has a surrounding bottom surface, wherein the outlet hole extends outwardly from the bottom surface. By means of such a ring groove, which extends outwardly from the wall surface, i.e. into the wall of the stationary casing, liquid impurities flowing along the inner wall surface will be caught. The liquid impurities move at a relatively high speed in a rotating path along the direction of rotation. The liquid impurities will be collected in the ring groove and flow in the direction of rotation in the ring groove.

According to a further embodiment, also the second liquid outlet comprises an annular collecting channel, which extends around a separation space radially outside the ring groove. In such a way, the separated liquid impurities, which thereafter can be conveyed away from the centrifugal separator by means of one single conduit, will be collected in an easy and convenient manner. Advantageously, the outlet hole of the second liquid outlet may extend between the ring groove and the collecting channel so that the liquid impurities flowing in the direction of rotation in the ring groove in an easy way can be discharged to the annular collecting channel.

According to a further embodiment, the ring groove has a first limiting wall, which extends downstream the bottom surface between the bottom surface and the inner wall surface, wherein the outlet hole of the second liquid outlet has an upper point located at the level of the first limiting wall. It is thus ensured that all liquid impurities flowing in the ring groove will be discharged through the outlet hole to the annular collecting channel. Advantageously, the first limiting wall may extend substantially in parallel with a radial plane.

According to a further embodiment, the ring groove has a second limiting wall, which extends upstream the bottom surface between the bottom surface and the inner wall surface. Advantageously, the second limiting wall is inclined in relation to a radial plane.

According to a further embodiment, the centrifugal separator comprises at least one guide vane, which is provided to guide the flow of the separated liquid impurities through the outlet hole of the second liquid outlet. Advantageously, the guide vane may extend through the outlet hole of the second liquid outlet, wherein the liquid impurities in an efficient manner are conveyed through the outlet hole and into the annular collecting channel. The guide vane may advantageously extend in at least one direction which is inclined outwardly and forwardly in relation to a tangent of the direction of rotation at the outlet hole of the second liquid outlet.

According to a further embodiment, the outlet hole of the second liquid outlet has in relation to the direction of rotation a forward limiting surface and rearward limiting surface, wherein at least one of these limiting surfaces extends in a direction which is inclined outwardly and forwardly in relation to a tangent of the direction of rotation at the outlet hole of the second liquid outlet.

BRIEF DESCRIPTION OF THE DRAWINGS

The invention is now to be explained more closely through a description of various embodiments disclosed by way of example and with reference to the drawings attached hereto.

DETAILED DESCRIPTION

Figure 1:
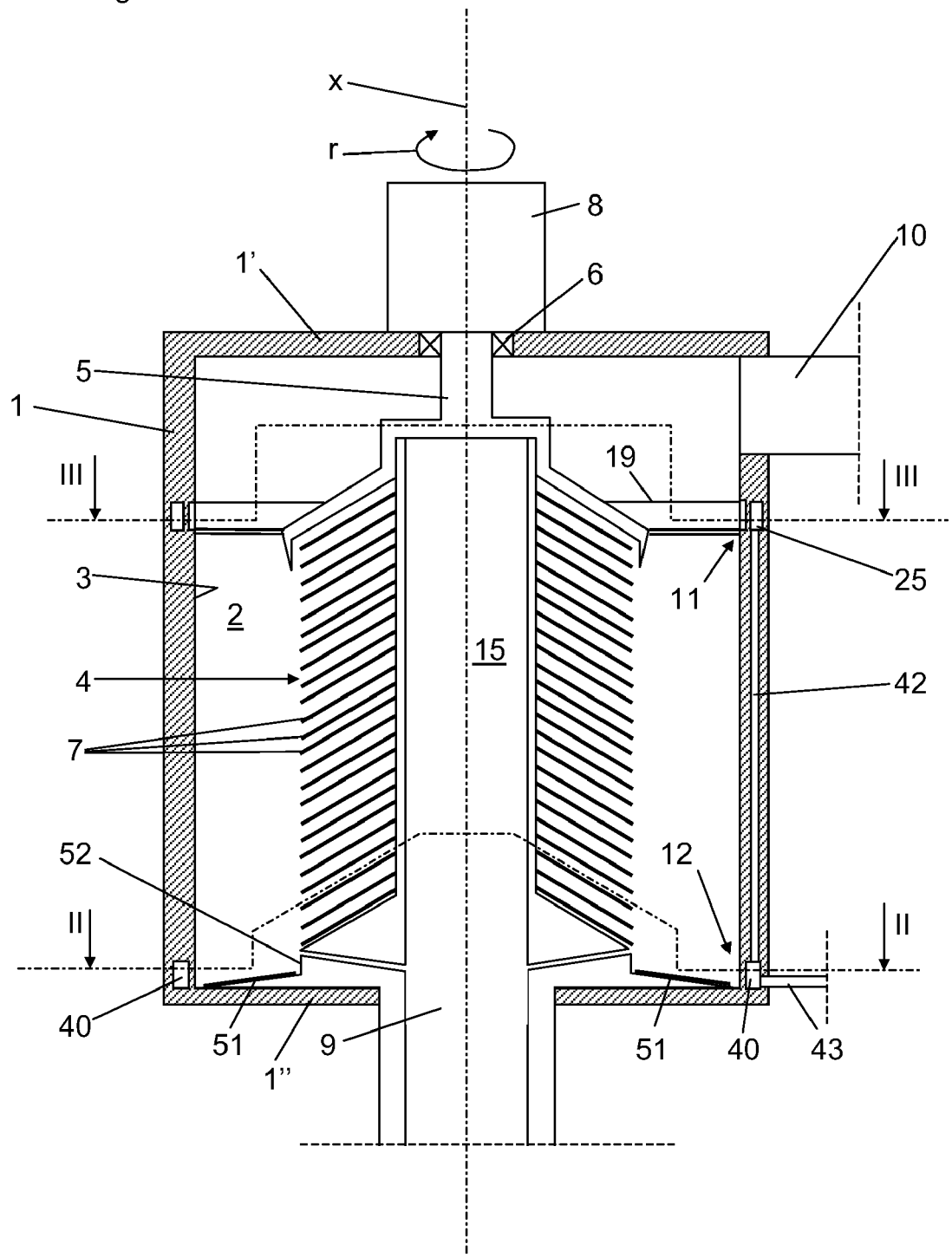
FIG. 1 discloses a vertical section through a centrifugal separator according to the invention.

FIG. 1 discloses a centrifugal separator for cleaning of a gas containing liquid impurities, for instance oil in the form of oil mist or oil particles, and possibly solid particles. The centrifugal separator comprises a stationary casing 1, which encloses a substantially closed separation space 2. The casing 1 has an inner wall surface 3, which faces the separation space 2. The separation space 2 is arranged to permit the gas to flow therethrough.

The centrifugal separator also comprises a rotating member 4, which is provided in the separation space 2 and arranged to rotate in a direction r of rotation around an axis x of rotation, which also forms a centre axis through the casing 1. The centrifugal separator is provided in such a way that the axis x of rotation extends substantially vertically so that the stationary casing 1 has an upper end 1' and a lower end 1".

The rotating member 4 comprises a spindle member 5, which is journalled in the casing 1 in the proximity of the upper end 1' by means of a bearing 6, and a number of separating discs 7. In the embodiment disclosed, the separating discs 7 are conical and extend obliquely downwardly and outwardly from the spindle member 5. The invention is also applicable to rotating members having completely radial separating discs or separating discs extending in axial planes from the spindle member 5. The rotating member 4 is driven by means of a drive member 8, for instance an electrical motor, and is adapted to bring the gas to rotation in the direction r of rotation for separating, by means of centrifugal forces, the liquid impurities from the gas.

In the embodiment disclosed, the centrifugal separator also comprises an inlet 9 for the gas to be cleaned, a gas outlet 10 for the cleaned gas, a second liquid outlet 11 for the separated liquid impurities and a first liquid outlet 12 for the separated liquid impurities.

The inlet 9 is centrally provided and extends through the lower end 1" of the casing 1. The inlet 9 conveys the gas into a central space 15 of the rotating member 4. From this central space 15, the gas is conveyed radially outwardly to the gaps formed between the separating discs 7. The gas outlet 10 is provided at the upper end 1' of the casing 1 downstream the rotating member 4. The gas leaving the gaps between the separating discs 7 thus rotates at a high rotary speed in the direction r of rotation and will continue this rotating movement upwardly to the gas outlet 10 where the cleaned gas leaves the separation space 2.

The second liquid outlet 11 is provided upstream the gas outlet 10 and downstream the rotating member 4 with respect to the gas flow. The first liquid outlet 12 is provided at the lower end 1" of the casing 1 and upstream the second liquid outlet 11 with respect to the gas flow. In the embodiment disclosed, the first liquid outlet 12 forms a main outlet, which is adapted for discharge of a main part of the liquid impurities, and the second liquid outlet 11 a residual outlet, which is adapted for discharge of substantially all residual liquid impurities. It is to be noted that the separated liquid impurities may contain solid particles which are discharged via the liquid outlets 11 and 12.

Figure 6:
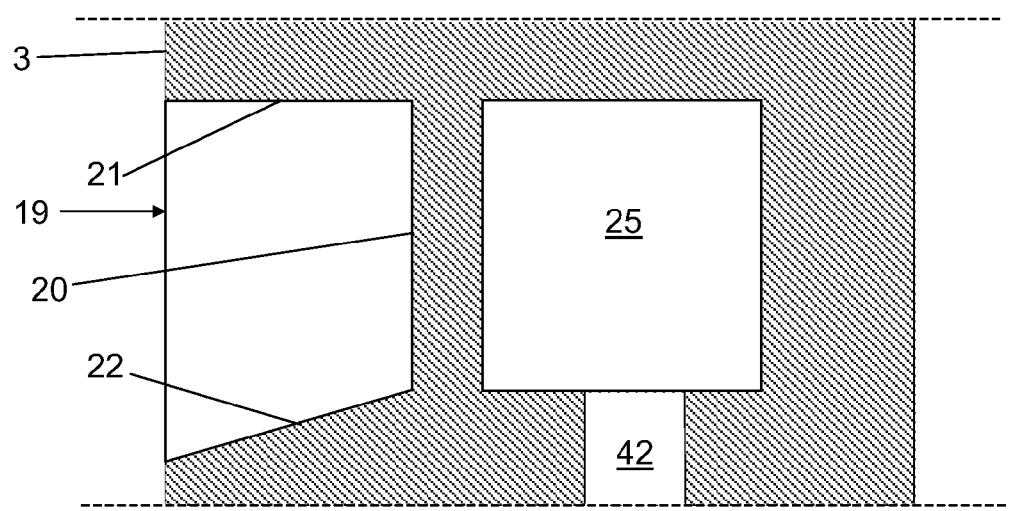
FIG. 6 discloses an axial section through a liquid outlet of the centrifugal separator in FIG. 1.

The centrifugal separator comprises a surrounding ring groove 19, which extends outwardly from the inner wall surface 3 and into the wall of the stationary casing 1. The ring groove 19, see FIG. 6, has a surrounding bottom surface 20. The bottom surface 20 extends substantially in parallel with the axis x of rotation. The ring groove 19 also has a first, upper limiting wall 21, which extends downstream the bottom surface 20 between the bottom surface 20 and the inner wall surface 3. The first limiting wall 21 extends substantially in parallel with a plane being radial in relation to the axis x of rotation. The ring groove 19 also has a second, lower limiting wall 22, which extends upstream the bottom surface 20 between the bottom surface 20 and the inner wall surface 3. The second limiting wall 22 is inclined in relation to a radial plane, and more precisely radially outwardly and upwardly from the inner wall surface 3. The ring groove 19 is in the embodiment disclosed provided immediately below the gas outlet 10 at the level of an upper part of the rotating member 4. More precisely, the ring groove 19 is located at the level of the uppermost separating disc 7 and somewhat above the outlet of the gap formed between the two uppermost separating discs 7.

Furthermore, the centrifugal separator comprises an annular collecting channel 25, which extends around the separation space 2 radially outside the ring groove 19 in a peripheral direction. In the embodiment disclosed, the collecting channel 25 extends in the wall of the stationary casing 1 at the level of the ring groove 19.

Figure 4:
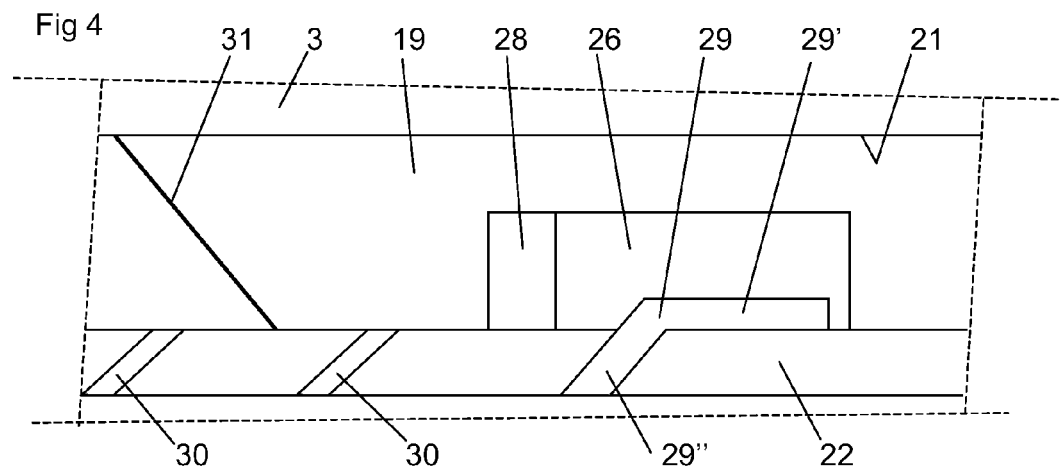
FIG. 4 discloses a view from inside the centrifugal separator towards an outlet hole of a liquid outlet of the centrifugal separator in FIG. 1.

The second liquid outlet 11 comprises at least one outlet hole 26, which extends outwardly from the bottom surface 20 and forms a passage between the ring groove 19 and the collecting channel 25. In the embodiment disclosed, three such outlet holes 26 are provided between the ring groove 19 and the collecting channel 25. It is to be noted that the centrifugal separator may comprise another number than the disclosed three outlet holes 26, for instance 1, 2, 4, 5, 6 or more outlet holes 26. Furthermore, each such outlet hole 26 has in the embodiment disclosed an upper point located below the first limiting wall 21, see FIG. 4.

Figure 5:
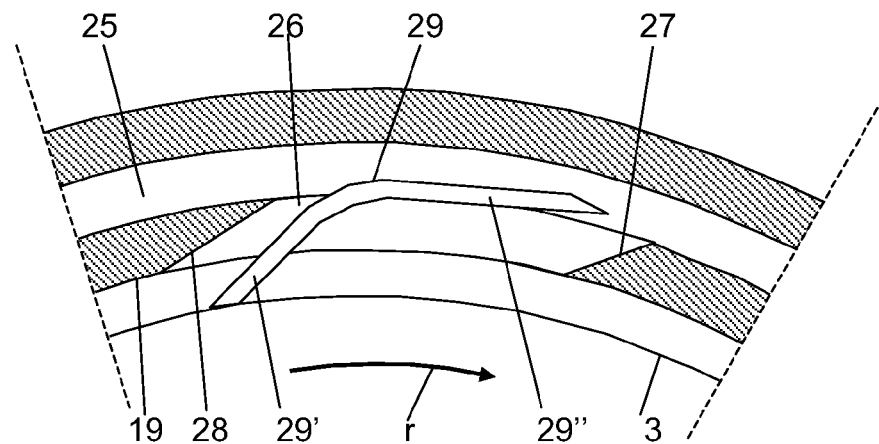
FIG. 5 discloses a section from above through the outlet hole in FIG. 4.

Each outlet hole 26 has, in relation to the direction r of rotation, a forward limiting surface 27 and a rearward limiting surface 28, see FIG. 5. At least one of these limiting surfaces 27, 28 extends in a direction, which is inclined outwardly and forwardly in relation to a tangent of the direction r of rotation at the outlet hole 26 concerned. In the embodiment disclosed, both the forward limiting surface 27 and the rearward limiting surface 28 are inclined in such a direction.

Each outlet hole 26 also comprises a guide vane 29, which is provided to guide the flow of the separated liquid impurities through the outlet hole 26. Such a guide vane 29, which is disclosed more closely in FIG. 4, extends through the outlet hole 26 and more precisely from an inner end at the level of the inner wall surface 3 to an outer end located in the collecting channel 25. Each guide vane 29 extends at least in one direction, which is inclined outwardly and forwardly in relation to a tangent of the direction r of rotation at the outlet hole 26. Furthermore, each guide vane 29 has in the embodiment disclosed a first inner part 29', which has a more radial inclination outwardly than a second outer part 29" of the guide vane 29. It is to be noted that the centrifugal separator also may comprise guide vanes having another configuration and another location for guiding the flow of liquid impurities towards and through the outlet holes 26. Especially, the centrifugal separator may comprise one or several guide vanes 30, which are located upstream the outlet hole 26 seen in the direction r of rotation. The guide vanes 30 are provided on the second inclined limiting wall 22 and are inclined obliquely upwardly in the direction r of rotation. Furthermore, there may be a guide member 31, which also is located upstream the outlet hole 26, but provided on the bottom surface 20. The guide member 31 extends along the height of the whole bottom surface 20 and is inclined forwardly and downwardly in the direction of rotation. The guide member 31 may be configured as a groove, or as a projecting guide element. The guide member 31 may also be configured in such a way that it merely comprises one limiting surface, which extends inwardly from the bottom wall 20 whereafter the bottom wall 20 very slowly again reaches its peripheral level.

Figure 2:
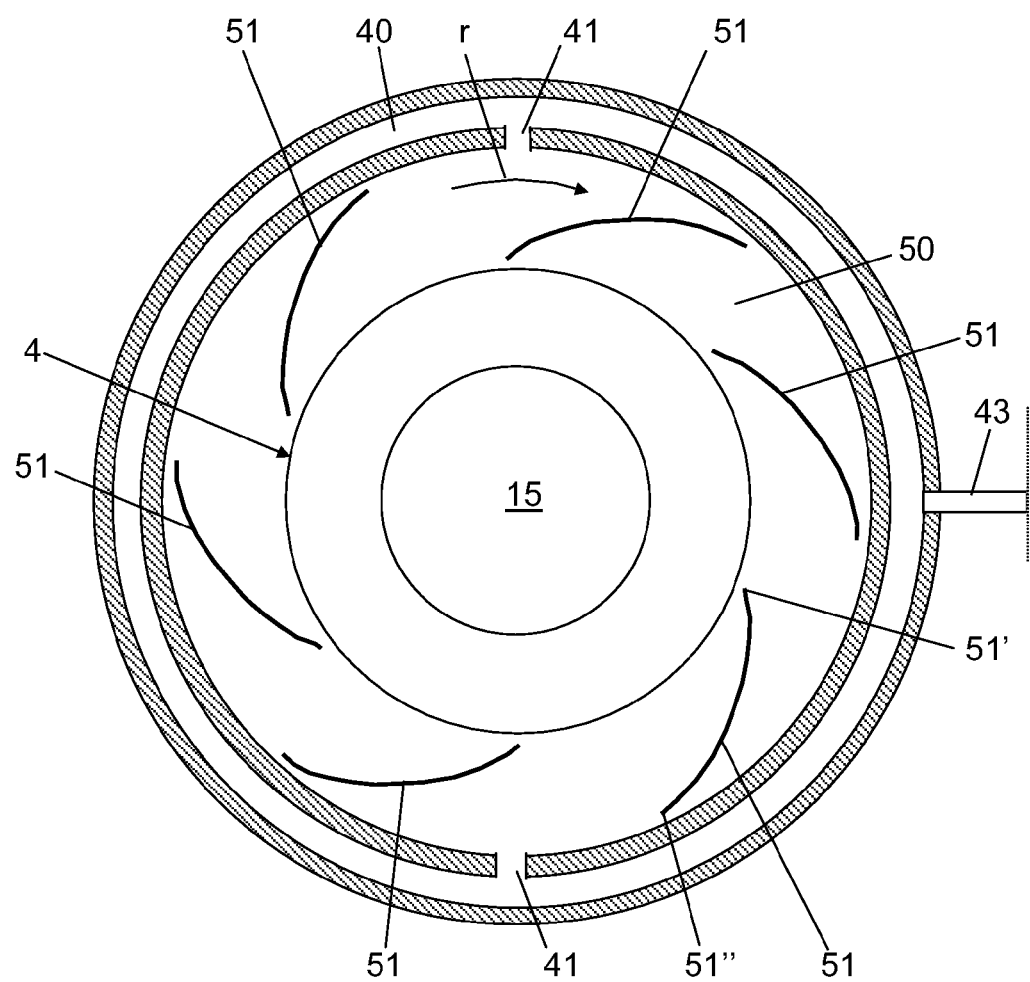
FIG. 2 discloses a cross section along the line II-II in FIG. 1.
Figure 3:
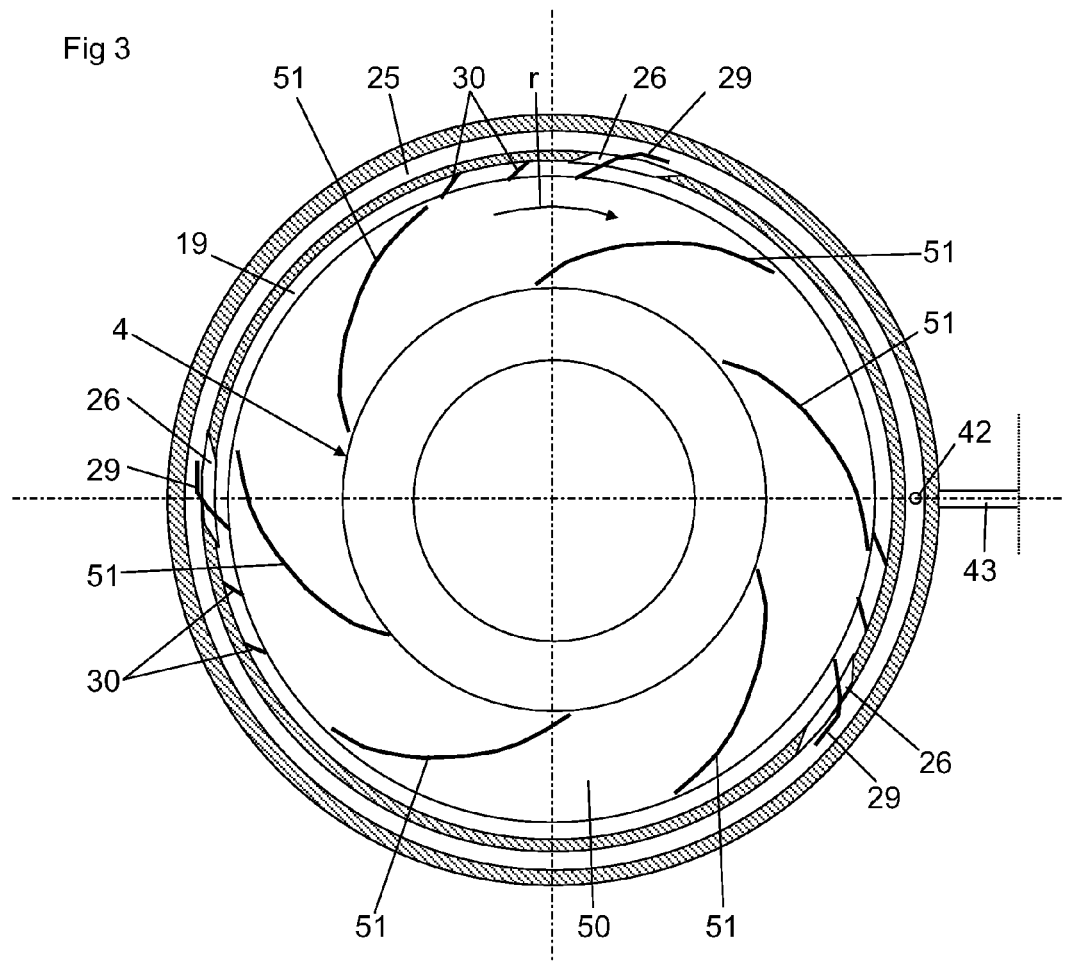
FIG. 3 discloses a cross section along the line III-III in FIG. 1.

The first liquid outlet 12 also comprises an annular collecting channel 40, which extends around the separation space 2 radially outside the inner wall surface 3. Furthermore, at least one outlet hole 41 is provided so that it extends between the separation space 3 and the collecting channel 40. In the embodiment disclosed, there are two such outlet holes 41, see FIG. 2. It is to be noted that the centrifugal separator may comprise another number than the disclosed two outlet holes 41, for instance 1, 3, 4, 5, 6 or more outlet holes 41. The first liquid outlet 12, i.e. the outlet holes 41 are provided at the lower end 1".

As can be seen in FIG. 1, the annular collecting channel 25 of the second liquid outlet 11 is connected to the annular collecting channel 40 of the first liquid outlet 12 via at least one connecting channel 42, which in the embodiment disclosed extends substantially in parallel with the axis x of rotation. It is of course possible to provide more than one such connecting channel 42. From the annular collecting channel 40 also at least one discharge conduit 43 extends for discharge of the separated liquid impurities from the centrifugal separator.

The centrifugal separator also comprises an annular surface 50, which extends between the rotating member 4 and the inner wall surface 3. The annular surface 50 is configured to transport liquid impurities radially outwardly. In the embodiments disclosed, the annular surface 50 forms a lower annular end surface of the separation space 2, which extends between the rotating member 4 and the inner wall surface 3. The annular surface 50 is designed to transport liquid impurities radially outwardly to the first liquid outlet 12. The annular surface 50 is in the embodiment disclosed slightly conical and inclined outwardly and downwardly, see FIG. 1. It is to be noted, however, that the annular surface 50 also may be substantially planar or even inclined somewhat outwardly and upwardly.

Furthermore, the centrifugal separator comprises a number of guide elements 51, which are provided on the annular surface 50 and arranged to promote the transport of the liquid impurities outwardly towards the inner wall surface 3 and the outlet holes 41. The guide elements 51 are, seen radially outwardly, directed forwardly in the direction r of rotation. The guide elements 51 may be straight or, as in the embodiment disclosed, curved. In the embodiment disclosed, the centrifugal separator has six guide elements 51. It is to be noted that more or less such guide elements 51 may be provided on the annular surface 50. The outlet holes 41 adjoin the annular surface 50, i.e. the outlet holes 41 have a lower end located at the level of the lower end surface at its radially outer periphery.

Figure 7:
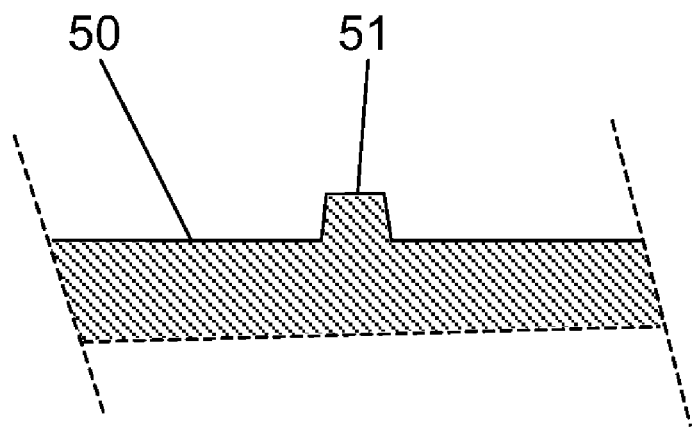
FIG. 7 discloses a section through a guide element in the form of a rib of a surface in the centrifugal separator in FIG. 1.
Figure 8:
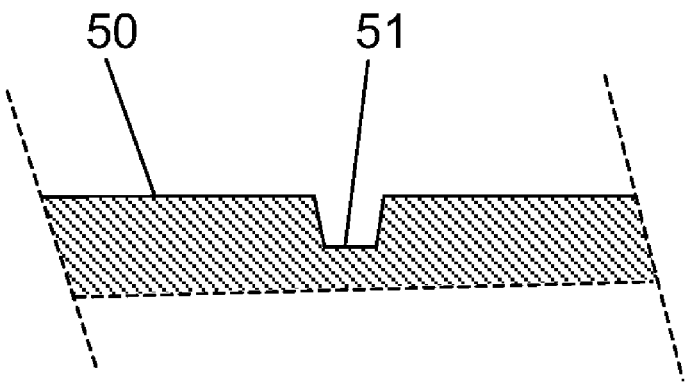
FIG. 8 discloses a similar section through a guide element in the form of a groove.

In the embodiment disclosed, the guide elements 51 are configured as ribs, which extend upwardly from the annular surface 50, see FIG. 7. The guide elements 51 may then have a height from the annular surface 50 that it as least approximately 1 mm. The guide elements 51 may also be configured as grooves extending downwardly from the annular surface 50, see FIG. 8. Also in this case, the guide elements 51 may have a height or a depth of at least approximately 1 mm from the annular surface 50. In the embodiment disclosed, there is also a small gap at least between the radially outer end of the guide elements 51 and the inner wall surface 3 so that the liquid impurities may flow freely on the annular surface 50 along the inner wall surface 3 to one of the outlet holes 41.

Each guide element 51 has a first radially inner end 51' and a second radially outer end 51". The radially outer end 51" is located in the proximity of but at a distance from the inner wall surface 3 so that a radially outer passage is formed between the inner wall surface 3 and the radially outer end 51', see FIG. 2. The radially inner end 51' is located in the proximity of but at a distance from an annular inner end of the annular surface 50. The annular inner end of the annular surface 50 is defined by an upwardly projecting surrounding surface 52, which for instance may be substantially cylindrical or cylindrical. In such a way, a radially inner passage is formed between the annular inner end and the radially inner end 51' of each guide element, see FIG. 2.

The centrifugal separator disclosed may for instance be used for cleaning of gas containing oil in the form of oil particles and/or oil mist. The gas to be cleaned may then be conveyed via the inlet 9 to the space 15. Due to the rotation of the rotating member 4, the gas will also be sucked into the gaps between the separating discs 7, wherein oil will be attached to these discs 7 and due to the centrifugal force transported outwardly on the discs 7. The oil then leaves the discs 7 and is thrown against the inner wall surface 3. The oil will then flow downwardly on the inner wall surface 3 to the annular surface 50 and the first liquid outlet 12 where the oil will flow out through the outlet holes 41 into the collecting channel 40. A part of the oil, which hits the inner wall surface 3, will due to the gas flow from the rotating member upwardly to the gas outlet 10, be transported upwardly along the inner wall surface 3. This oil will flow down into the ring groove 19 and be conveyed into the collecting channel 25 via the outlet holes 26. From the collecting channel 25, the separated oil is then transported down to the collecting channel 40. All separated oil is thus transported to this collecting channel 40, and from there out from the centrifugal separator via the discharge conduit 43.

The invention is not limited to the embodiments disclosed, but may be varied and modified within the scope of the following claims. It is to be noted that the invention is applicable to all annular surfaces extending between the inner wall surface 3 and the rotating member 4 and not only on the lower end surface of the separation space 2.

What is claimed is:

1. A centrifugal separator for cleaning of a gas containing liquid impurities, wherein the centrifugal separator comprises:
   a stationary casing, which encloses a separation space and has an inner wall surface which faces the separation space, wherein the separation space permits flowing of the gas therethrough;
   an inlet for the gas to be cleaned;
   a rotating member, which is provided in the separation space downstream the inlet with respect to the gas flow and arranged to rotate in a direction (r) of rotation around an axis (x) of rotation, wherein the rotating member is adapted to bring the gas to rotation in the direction (r) of rotation for separating, by means of centrifugal forces, at least a main part of the liquid impurities from the gas;
   a gas outlet, which with respect to the gas flow is provided downstream the rotating member for discharge of the cleaned gas; and
   a first liquid outlet, which is provided for discharge of the separated liquid impurities, wherein the separating space comprises an annular surface, which extends between the rotating member and the inner wall surface, and where the annular surface is configured to transport liquid impurities radially outwardly to the first liquid outlet.

2. A centrifugal separator according to claim 1, wherein the centrifugal separator comprises a number of guide elements provided on the annular surface and arranged to promote said transport.

3. A centrifugal separator according to claim 2, wherein said guide elements seen radially outwardly are directed forwardly in the direction (r) of rotation.

4. A centrifugal separator according to claim 3, wherein said guide elements are substantially straight seen in the direction of the axis (x) of rotation.

5. A centrifugal separator according to claim 4, wherein said guide elements are curved seen in the direction of the axis (x) of rotation.

6. A centrifugal separator according to claim 2, wherein said guide elements are configured as ribs extending upwardly from the annular surface.

7. A centrifugal separator according to claim 2, wherein said guide elements are configured as grooves extending downwardly from the annular surface.

8. A centrifugal separator according to claim 2, wherein each guide element has a first radially inner end and a second radially outer end, wherein the radially outer end is located in the proximity of but at a distance from the inner wall surface so that a radially outer passage is formed between the inner wall surface and the radially outer end.

9. A centrifugal separator according to claim 8, wherein the radially inner end is located in the proximity of but at a distance from an annular inner end of the annular surface so that a radially inner passage is formed between the annular inner end and the radially inner end.

10. A centrifugal separator according to claim 9, wherein the annular inner end of the annular surface is defined by an upwardly protecting surrounding surface.

11. A centrifugal separator according to claim 1, wherein the annular surface is conical and inclined outwardly and downwardly.

12. A centrifugal separator according to claim 1, wherein the first liquid outlet comprises an annular collecting channel, which extends around the separation space radially outside the inner wall surface.

13. A centrifugal separator according to claim 12, wherein the first liquid outlet comprises at least one outlet hole, which extends between the separation space and the collecting channel and which adjoins the annular surface.

14. A centrifugal separator according to claim 1, wherein the centrifugal separator is arranged to be provided in such a way that the axis (x) of rotation extends substantially vertically, wherein the stationary casing has an upper end and a lower end and wherein the first liquid outlet is provided at the lower end.

15. A centrifugal separator according to claim 14, wherein the annular surface forms a lower end surface of the separation space.

16. A centrifugal separator according to claim 14, wherein the gas outlet is provided in the proximity of the upper end.

17. A centrifugal separator according to claim 1, wherein the rotating member comprises a number of separating discs.

18. A centrifugal separator according to claim 1, wherein the centrifugal separator also comprises a second liquid outlet, which is provided upstream the gas outlet and downstream the first liquid outlet for discharge of separated liquid impurities and which comprises at least one outlet hole.

19. A centrifugal separator according to claim 18, wherein the first liquid outlet forms a main outlet and the second liquid outlet forms a residual outlet.

20. A centrifugal separator according to claim 18, wherein the centrifugal separator comprises a surrounding ring groove, which extends outwardly from the inner wall surface in the stationary casing and which has a surrounding bottom surface, wherein the outlet hole of the second liquid outlet extends outwardly from the bottom surface.

21. A centrifugal separator according to claim 20, wherein the second liquid outlet also comprises an annular collecting channel, which extends around the separation space radially outside the ring groove.

22. A centrifugal separator according to claim 21, wherein the outlet hole of the second liquid outlet extends between the ring groove and the collecting channel.

23. A centrifugal separator according to claim 20, wherein the ring groove has a first limiting wall, which extends downstream the bottom surface, between the bottom surface and the inner wall surface, wherein the outlet hole of the second liquid outlet has an upper point located beneath the first limiting wall.

24. A centrifugal separator according to claim 23, wherein the first limiting wall extends substantially in parallel with a radial plane.

25. A centrifugal separator according to claim 24, wherein the ring groove has a second limiting wall, which extends upstream the bottom surface between the bottom surface and the inner wall surface.

26. A centrifugal separator according to claim 25, wherein the second limiting wall is inclined in relation to a radial plane.

27. A centrifugal separator according to claim 18, wherein the centrifugal separator comprises at least one guide vane, which is provided to guide the flow of the separated liquid impurities through the outlet hole of the second liquid outlet.

28. A centrifugal separator according to claim 27, wherein the guide vane extends through the outlet hole of the second liquid outlet.

29. A centrifugal separator according to claim 27, wherein the guide vane extends in at least one direction, which is inclined outwardly and forwardly in relation to a tangent to the direction (r) of rotation at the outlet hole of the second liquid outlet.

30. A centrifugal separator according to claim 18, wherein the outlet hole of the second liquid outlet in relation to the direction of rotation has a forward limiting surface and a rearward limiting surface, wherein at least one of these limiting surfaces extends in a direction, which is inclined outwardly and forwardly in relation to a tangent of the direction (r) of rotation at the outlet hole of the second liquid outlet.

* * * * *